United States Patent
Li et al.

(10) Patent No.: US 9,894,560 B2
(45) Date of Patent: Feb. 13, 2018

(54) METHOD AND DEVICE FOR CONTROLLING QOS AND/OR POLICY AND CHARGING CONTROL OF A GUEST USER

(75) Inventors: Xiangyang Li, Shanghai (CN); Yigang Cai, Naperville, IL (US)

(73) Assignees: Alcatel Lucent, Boulogne-Billancourt (FR); Alcatel-Lucent USA Inc., Murray Hill, NJ (US)

( * ) Notice: Subject to any disclaimer, the term of this patent is extended or adjusted under 35 U.S.C. 154(b) by 201 days.

(21) Appl. No.: 14/113,984

(22) PCT Filed: Apr. 27, 2011

(86) PCT No.: PCT/CN2011/073404
§ 371 (c)(1),
(2), (4) Date: Oct. 25, 2013

(87) PCT Pub. No.: WO2012/145902
PCT Pub. Date: Nov. 1, 2012

(65) Prior Publication Data
US 2014/0036785 A1    Feb. 6, 2014

(51) Int. Cl.
*H04W 28/12* (2009.01)
*H04L 12/14* (2006.01)
(Continued)

(52) U.S. Cl.
CPC ......... *H04W 28/12* (2013.01); *H04L 12/1407* (2013.01); *H04M 15/66* (2013.01);
(Continued)

(58) Field of Classification Search
CPC .... H04L 12/1407; H04W 4/24; H04W 28/12; H04M 15/8016; H04M 15/66; H04M 15/80
See application file for complete search history.

(56) References Cited

U.S. PATENT DOCUMENTS

2006/0010236 A1 * 1/2006 Meiser et al. ................ 709/226
2009/0172782 A1   7/2009 Taglienti et al.
(Continued)

FOREIGN PATENT DOCUMENTS

CN    101083538 A    12/2007
CN    101493828 A    7/2009
(Continued)

OTHER PUBLICATIONS

Supplementary European Search Report for corresponding European Application No. 11864164.6, dated Feb. 5, 2015, 5 pages.
(Continued)

*Primary Examiner* — Gbemileke J Onamuti
(74) *Attorney, Agent, or Firm* — Fay Sharpe, LLP

(57) ABSTRACT

The invention proposes a method and device for controlling QoS and/or policy and charging control of a guest user. The method proposes an innovative solution to extend the current policy and charging control architecture and online charging system to dynamically control the data connection of third party application services over network operator's network. This enables network operator and third party application provider to jointly provide QoS control service based on end user service usage limit.

12 Claims, 4 Drawing Sheets

(51) Int. Cl.
  *H04M 15/00* (2006.01)
  *H04W 4/24* (2009.01)
(52) U.S. Cl.
  CPC ....... *H04M 15/80* (2013.01); *H04M 15/8016* (2013.01); *H04W 4/24* (2013.01)

(56) References Cited

U.S. PATENT DOCUMENTS

2011/0067085 A1\* 3/2011 Brouard et al. ................. 726/1
2012/0030019 A1\* 2/2012 Dunmire et al. .......... 705/14.53

FOREIGN PATENT DOCUMENTS

| EP | 2 059 002 A1 | 5/2009 |
|---|---|---|
| WO | WO2011/031240 A1 | 3/2011 |

OTHER PUBLICATIONS

Openet, "Possible Flows on Sy," 3GPP TSG SA WG2 Meeting #78, Feb. 22-26, 2010, San Francisco, USA, Document for: Approval, Agenda Item: 9.11, Work Item / Release: FS_PP/Rel-10, TD S2-101313, 5 pages.

Qualcomm Incorporated, et al., "Support for sponsored data connectivity: Impacts to current stage 2," 3GPP TSG SA WG2 Meeting #79, May 10-14, 2010, Kyoto, Japan, TD S2-102096, Document for: Discussion / Approval, Agenda Item: 9.11, Work Item / Release: FS_PP Rel-10, 11 pages.

"3rd Generation Partnership Project; Technical Specification Group Services and System Aspects; Policy and charging control architecture (Release 10)," 3GPP TS 23.203 V10.3.0 (Mar. 2011), Technical Specification, 133 pages.

International Search Report for PCT/CN2011/073404 dated Dec. 15, 2011.

\* cited by examiner

METHOD AND DEVICE FOR CONTROLLING QOS AND/OR POLICY AND CHARGING CONTROL OF A GUEST USER

FIELD OF THE INVENTION

The present invention relates to telecommunication field, and more particularly relates to method and device for controlling QoS and/or policy and charging control of a guest user.

BACKGROUND OF THE INVENTION

With the emerging of Application Enabler which is defined in the OMA specification, the mobile networks will allow subscribers from the third party application service, also called guest user, to register and place voice and/or data calls via the mobile network infrastructure as guest users, but there is no policy and charging control (PCC) for the guest users, which needs to be resolved as soon as possible.

Also with Third Generation Partnership Project Long Term Evolution (3 GPP LTE) mobile broadband technology getting matured, it makes possible for end user to conveniently access and/or download applications via mobile handset anytime and anywhere. A new sponsored data and charging account connection business model is emerging between network operators and third party application providers. In new business model, the third party application provider will own the users and their accounts, and the end user will pay for the service fee to the third party application provider (for example, AppStore provider, instead of directly paying for the service fee to the mobile operator. The third party application provider will have further revenue sharing with the network operator to guarantee the quality of service (QoS) of its application via mobile operator's broadband network.

However, 3GPP architecture doesn't well address the new emerging sponsored business model between network operators (for example, mobile operator) and third party application provider (for example, AppStore) (refer to 3GPP TS 23.203 and 23.913). The 3GPP PCC architecture only provides the solution for network operator to control its own subscriber's data service connection, and does not propose how to have policy and charging control for the end users owned by the third party application provider, since the third party end user pays for the connectivity which is separate from the subscriber's online charging in the PCC architecture.

SUMMARY OF THE INVENTION

The invention proposes a method of controlling QoS and/or Policy and Charging Control of a guest user. The invention proposes an innovative solution to extend the current PCC architecture and Online Charging system (OCS) to dynamically control the data connection of third party application services over network operator's network. This enables network operator and third party application provider to jointly provide QoS control service based on end user service usage limit.

According to a first aspect of the present invention, there is provided a method of aiding controlling quality of service and/or policy and charging control of a user subscribing to a third party application service, in an online charging system in a telecommunication network, the method comprising: sending a user subscription request to a third party application provider that provides the third party application service, the request being used to request user subscription information from the third party application provider; obtaining a user subscription response according to a feedback from the third party application provider, the user subscription response comprising the information in responsive of the user subscription request; and providing the user subscription response to a first module.

According to a second aspect of the present invention, there is provided a method in a first module of interacting with an online charging system in a telecommunication network, comprising: determining whether a user subscribes to a third party application service; if the user subscribes to the third party application service, sending a user profile request to the online charging system, the user profile request being used to request the online charging system to provide the user profile information of the user; and obtaining a user subscription response from the online charging system, the user subscription response comprising the information in responsive of the user subscription request.

According to a third aspect of the invention, there is provided a first device for aiding controlling quality of service and/or policy and charging control of a user subscribing to a third party application service, in an online charging system in a telecommunication network, comprising: means for sending a user subscription request to a third party application provider that provides the third party application service, the request being used to request user subscription information from the third party application provider; means for obtaining a user subscription response according to a feedback from the third party application provider, the user subscription response comprising the information in responsive of the user subscription request; and means for providing the user subscription response to a first module.

According to a fourth aspect of the invention, there is provided a second device in a first module of interacting with an online charging system in a telecommunication network, comprising: means for determining whether a user subscribes to a third party application service; means for sending a user profile request to the online charging system, the user profile request being used to request the online charging system to provide the user profile information of the user if the user subscribes to the third party application service; and means for obtaining a user subscription response from the online charging system, the user subscription response comprising the information in responsive of the user subscription request.

This invention proposes a more generic solution to enhance existing 3 GPP PCC architecture to have policy and charging control for the third party application sponsored data service and/or application over network operator networks.

Besides, the invention is well compatible with the existing 3GPP standard charging architecture, and the invention can be applicable without specific work to enhance the Gx and Gy interface.

In addition, the invention will enable the application level transparent to the network bearer level, and network bearer does not need to have special enhancement for the sponsored data service connection.

BRIEF DESCRIPTION OF THE DRAWINGS

Other features, aspects and advantages of the present invention will become obvious by reading the following description of non-limiting embodiments with reference to the appended drawings.

Wherein, same or similar reference numerals refer to the same or similar steps or means.

DETAILED EMBODIMENTS OF THE INVENTION

The illustrative description of the embodiments of the present invention will be given in details combined with the appended figures.

Figure 1:
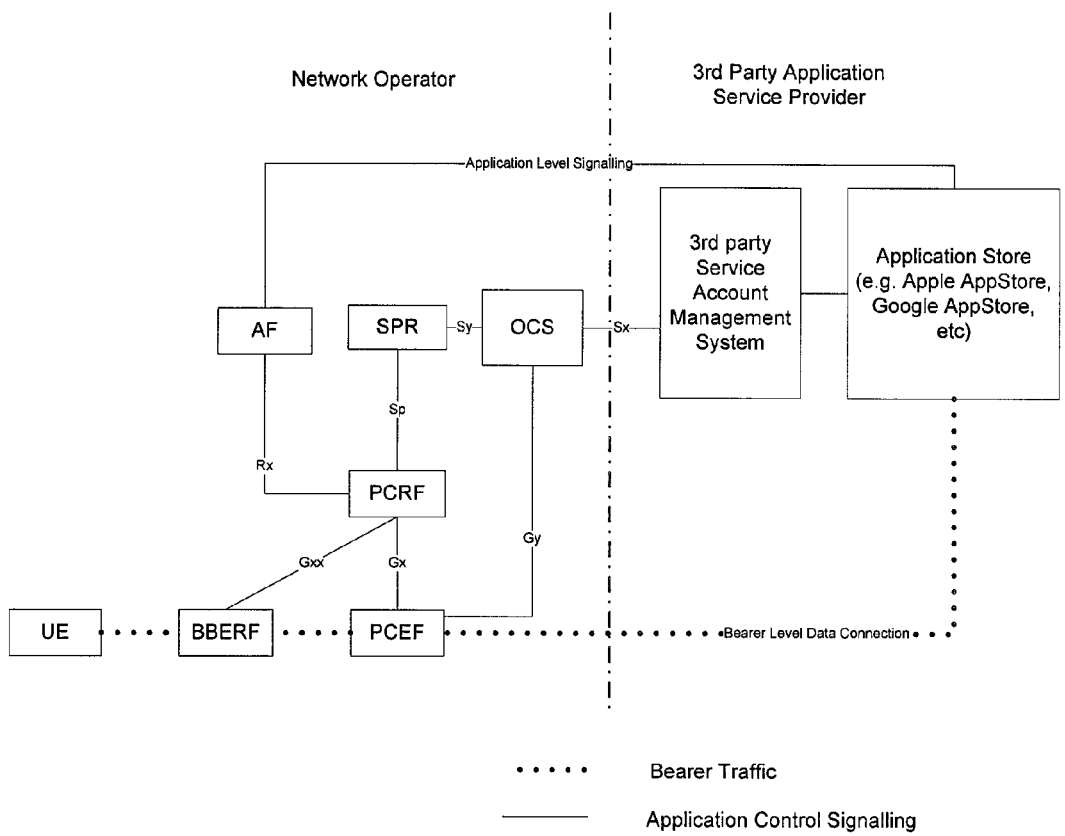
FIG. 1 shows a network architecture diagram of a real time policy and charging control for third party application sponsored data connection according to an embodiment of the present invention.

FIG. 1 shows a network architecture diagram of a real time policy and charging control for third party application sponsored data connection according to an embodiment of the present invention.

In FIG. 1, a plurality of LTE logical entities are shown. The followings are the brief description of the logical entities related to the present invention.

SPR represents Subscriber Profile Repository. The SPR logical entity contains all subscriber/subscription related information needed for subscription-based policies and Internet Protocol Connectivity Access Network (IP CAN) bearer level PCC rules by the Policy and Charging Rule Function (PCRF).

The SPR may provide the following subscription profile information:
  Subscriber's allowed services of the user equipment (UE) of the user;
  For each allowed service, a pre-emption priority;
  Information on subscriber's allowed QoS, including the Subscribed Guaranteed Bandwidth QoS;
  Subscriber's charging related information (e.g. location information relevant for charging);
  Subscriber category.

The PCRF encompasses policy control decision and flow based charging control functionalities. The PCRF provides network control regarding the service data flow detection, gating, QoS and flow based charging (except credit management) towards the Policy And Charging Enforcement Function (PCEF).

The PCEF encompasses service data flow detection, policy enforcement and flow based charging functionalities. This functional entity is located at the Gateway (e.g. GGSN in the GPRS case, and PDG in the WLAN case). It provides service data flow detection, user plane traffic handling, triggering control plane session management (where the IP CAN permits), QoS handling, and service data flow measurement as well as online and offline charging interactions.

The Application Function (AF) is an element offering applications that require dynamic policy and/or charging control over the IP CAN user plane behavior. The AF shall communicate with the PCRF to transfer dynamic session information, required for PCRF decisions as well as to receive IP CAN specific information and notifications about IP CAN bearer level events.

The BBERF represents Bearer Binding and Event Reporting Function. The BBERF includes the following functionalities: bearer binding; uplink bearer binding verification; event reporting to the PCRF and sending or receiving IP CAN-specific parameters, to or from the PCRF.

The network entities in the network operator's network, such as the AF, SPR, OCS, PCRF, BBERF and PCEF, are separated with the network entities in the third party application provider's network, such as the third party service account management system and application store, by dot dash line in FIG. 1.

In FIG. 1, an enhanced Sy interface (interface is also called reference point in 3GPP standards) is proposed between the SPR and the OCS. For the third party application sponsored service for which the third party application pays to the network operator, the SPR will further query the OCS to verify the validation of end user's guest status and sponsorship; the SPR will also query the end user's data usage and allowance, and pass the queried information to the PCRF to apply the dynamic QoS Control policy rules.

The OCS will have a new interface Sx to query the end user's subscription from the third party application provider. The OCS will reserve the charge from the external third party application provider, and the third party application provider will really maintain the user's account balance information and service subscription. When the OCS detects that its end user's usage for a specific application is over a certain spending limit threshold, it will notify the SPR to update QoS policy rule, so the third party end user's QoS will be enforced in the PCEF via the PCRF update operation.

The detailed enhancement for the SPR, OCS will be explained in details with the following FIG. 2.

Figure 2:
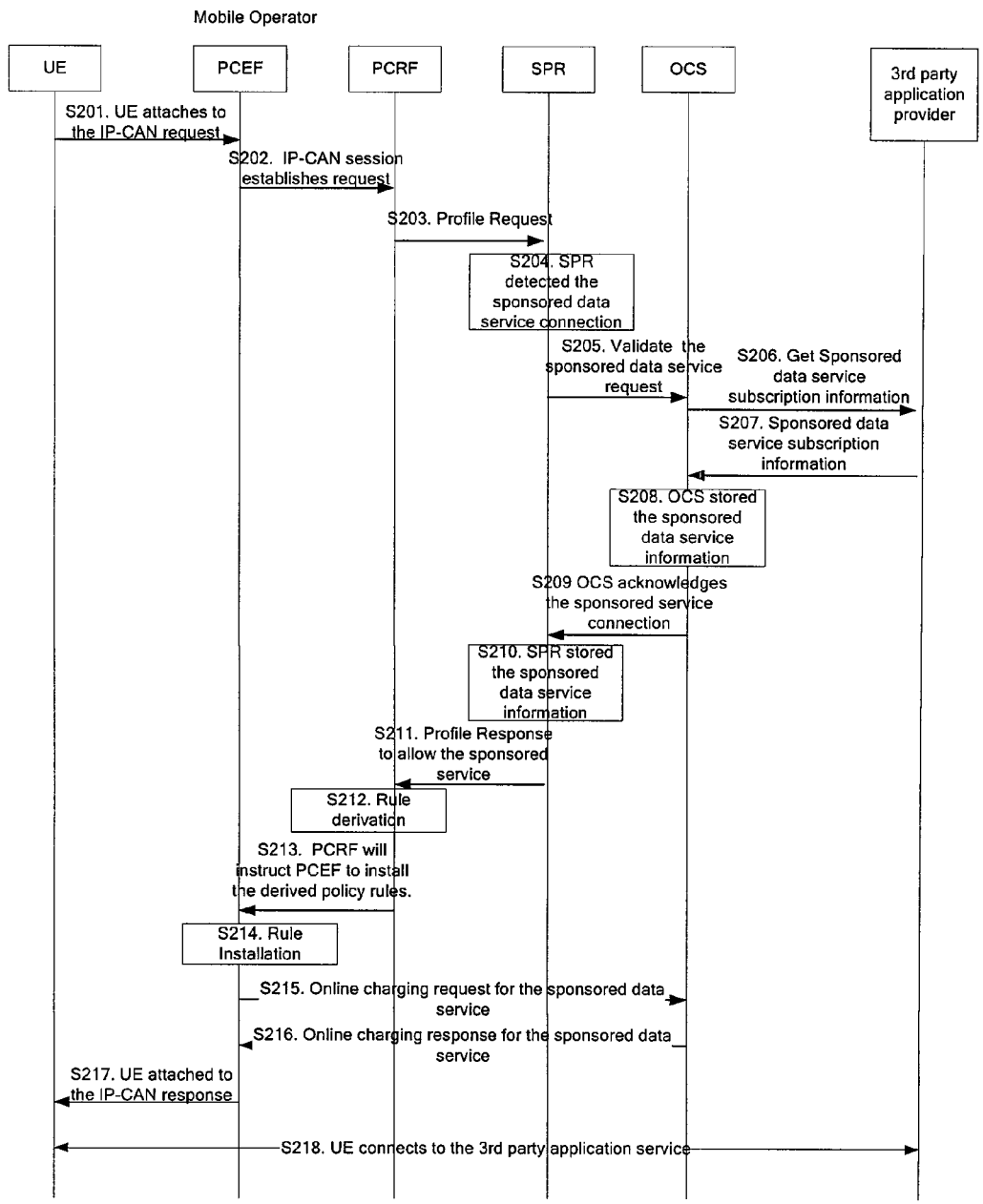
FIG. 2 illustrates a call flow for the third party application sponsored data connectivity session establishment procedure according to an embodiment of the present invention.

FIG. 2 illustrates a call flow for the third party application sponsored data connectivity session establishment according to an embodiment of the present invention.

First, in step S201, the UE sends IP-CAN request to the PCEF, to initiate an IP-CAN establishment procedure. Step S201 follows the normal procedure and the details are omitted for the sake of briefness. The UE may be a third party application provider sponsored user or a non-sponsored user.

Then, in step S202, the PCEF sends an IP-CAN session establishment request to the PCRF, to establish the IP-CAN session towards the PCRF. The UE's IP connection may have a limited amount of data usage. For example, the UE may only use limited bandwidth resources.

Then, in step S203, the PCRF sends a user profile request to the SPR, to query the subscriber profile information.

Then, in step S204, the SPR determines whether this data connection is sponsored by the third party application provider, based on the internal policy rule.

To be specific, the SPR may obtain the following information either from the database or locally from its configuration:
  Device Type of the user equipment (UE) of the user;
  Mobile MDN/MSIDSN prefix or number range of the UE of the user;
  IMSI prefix of the UE of the user;
  Access Point Number (APN) of the UE of the user;
  Access technology type of the UE of the user;
  Service flow identifier of the UE of the user;
  Service type of the UE of the user;
  Application type of the UE of the user;
  Location of the UE of the user;
  Roaming of the UE of the user; etc.

For example, the network operator may allocate a specific number range for the third party application provider as the third party application provider's UE number. Therefore, the number range of the UE can be used to identify whether the UE is a subscriber to the third party application provider. If the number of the UE belongs to the specific number range allocated for the third party application provider, then the UE is determined to be the subscriber to the third party application provider, and vice versa.

In another example, the roaming status is also needed to be taken into consideration when determining whether a user is a subscriber to the third party application provider. For example, the network may configure the internal policy rule that if a user is at roaming status, then it is not allowed to access to the service provided by the third party application provider for saving the bandwidth in the network. Therefore, when the user is at roaming status, the SPR may determine that the user is not allowed as a subscriber to the third party application provider.

Besides the above examples, similarly, other certain fields can also be used to identify whether the user is a subscriber to the third party application provider.

Then, in step S205, the SPR will further send the request to the OCS to validate the end user guest status and sponsored data service connection. The SPR will send the request via enhanced Sy interface.

As to the end user guest status and the sponsored data service connection, the SPR queries the OCS to obtain the information such as which third party application provider the user subscribes to, what kind of services that the user subscribes to the third party application provider, and the bandwidth quota corresponding to the user, etc.

Those skilled in the art may understand that the SPR may query both the third party application provider sponsored data connection information and non-sponsored data connection information in OCS; however, the latter is not in the scope of the present invention and is omitted for briefness. And the followings will be mainly focused on the case that the user is a third party application provider sponsored subscriber.

Therefore, after the SPR determines that the user subscribes to the third party application service in step S204, then in step S205, the SPR sends a user profile request to the OCS, the user profile request being used to request the OCS to provide the user profile information of the user to the SPR, so that the SPR can validate the end user's status and the sponsored data service connection.

Then, in step S206, the OCS will send user subscription request to the third party application provider to get the following information:

The subscribed data service information of the user in the third party application provider;

The data usage/spending allowance information.

Different from that the user profile request between the SPR and OCS may cover charging and QoS information for non-sponsored service and sponsored service, the user subscription request between the OCS and third application provider is only for the sponsored data service purpose. Besides, the query from the OCS is based on the service agreement between the mobile operator and the third party application provider.

Then, in step S207, the third party application provider will acknowledge the information to the OCS, that is, the third party application provider sends a feedback to the OCS. To be specific, the feedback sent from the third party application provider may include the subscribed data service information of the user in the third party application provider and the data usage/spending allowance information, for example, the time duration or bandwidth that the user is allowed to use the service provided by the third party application provider with a specific QoS.

Then, in step S208, the OCS stores the user account data and the third party application provider sponsored service information in the OCS on behalf of the third party application provider.

Then, in step S209, after the service is validated by the OCS, the user subscription response will be returned to the SPR via Sy interface. The user subscription response comprises sponsored service type, maximum allowed data allowance, the sponsored data usage and/or used counter value. Based on used counter value, the SPR may dynamically determine the new QoS for the sponsored data service.

Then, in step S210, the SPR will store the third party application sponsored data service information internally.

Then, in step S211, the SPR will also acknowledge the subscriber profile request to the PCRF, that is, the SPR sends the user profile response to the PCRF, and the user profile request comprises the sponsored service data information. The user profile response sent by the SPR to the PCRF is the same as the user profile response sent by OCS to the to the SPR. The contents of the user profile response sent by the SPR to the PCRF are different from the user profile response sent by OCS to the SPR.

Then, in step S212, the PCRF will have policy rule derivation. The PCRF determines the network QoS information for the third party application provider sponsored data service information according to the used counter value comprised in the user profile request.

Then, in step S213, the PCRF will acknowledge the IP-CAN session establishment, and instruct the PCEF to install the policy rule.

Then, in step S214, the PCEF installs the policy rule derived from the PCRF.

Then, in step S215, the PCEF sends a charging request to the OCS to apply the usage/credit control for the third party application sponsored data service.

Then, in step S216, the OCS returns the allowed data usage to the PCEF, and the OCS will also monitor the data service usage of the third party application sponsored data service.

Then, in step S217, the PCEF acknowledges the UE IP-CAN establishment, and the UE is successfully attached to mobile data networks.

Then, in step S218, the UE will successfully connect to the application store provided by third party application provider.

Figure 3:
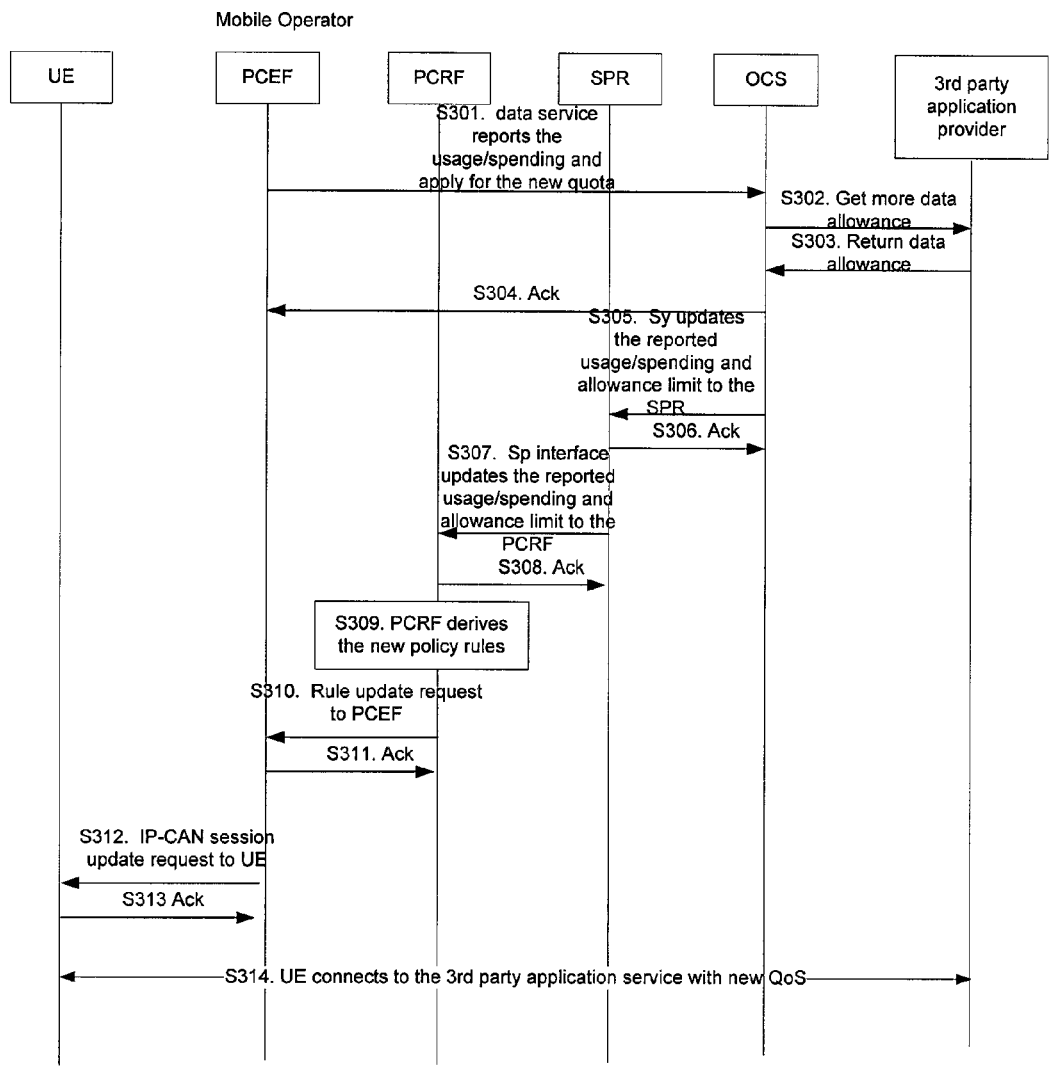
FIG. 3 illustrates a call flow for the third party application sponsored data connectivity extension procedure according to an embodiment of the present invention.

FIG. 3 illustrates a call flow for the third party application sponsored data connectivity extension procedure according to another embodiment of the present invention.

FIG. 3 shows an example call flow of user data exchange among third party application management and usage control system, the third party application provider for short, the SPR, and the PRCF. Thus the PCRF can well manage the information about the duration and/or the volume which is authorized by the third party application providers.

First, in step S301, the PCEF reports to the OCS data service report, which indicates the current data service usage of the third party application service used by the user. The PCEF also applies for new quota.

Then, in step S302, after the OCS receives the data service report from the PCEF, the OCS determines whether the allowed data usage is used up according to a first predetermined threshold. The OCS may obtain the first predetermined threshold either from the response in third party application provider, or from the threshold value that the OCS locally maintains for the third party application service. If the OCS determines that the allowed data usage is used up by the user, then, the OCS sends a request to third party application provider to get more data allowance. Otherwise, if the OCS determines that the allowed data usage is not used up by the user, preferable, the OCS will not send a signalling to the third party application provider.

Then, in step S303, the third party application provider grants the totally remaining allowance to the OCS for this subscriber.

If the third party application provider can grant more data allowance, then, the method may enter step S304, in which the OCS acknowledges to the PCEF for the data service access, and continually monitors the service data connection. Of course, if the third party application provider can grant more data allowance, then, the method may or may not enter step S305, that is to say, the QoS policy may be or may not be changed, since there are multiple thresholds cases, and different thresholds will have different QoS. It depends on the specific QoS policies. For example, the OCS may set the criteria that when there is only 5M bandwidth left for the subscriber who subscribes to the third party application service, the QoS policy is changed, for instance, the priority for the subscriber is decreased, for example, at least one of following items for the user, the required bit rate, delay, jitter, packet dropping probability or bit error rate, is adjusted.

Then, in step S305, the OCS detects whether the usage spending limit is reached; if the OCS detects that the usage spending limit is reached, that is to say, the third party application provider can not grant any more allowance to the user, the new charging policy shall be applied. Then, the OCS triggers Sy interface to the SRP to update the service usage and allowance information.

Then, in step S306, the SPR acknowledges the Sy request to the OCS.

Then, in step S307, the SPR will further update the information in the PCRF via Sp interface. The information comprises usage and/or spending and allowance limit of the third party application service that the user is allowed to use.

Then, in step S308, the PCRF will acknowledge the Sp request to the SPR.

Then, in step S309, the PCRF will derive the new QoS policy control rule based on the new data information.

Then, in step S310, the PCRF will update the new policy rule to the PCEF.

Then, in step S311, the PECF will acknowledge the updating request to the PCRF.

Then, in step S312, the PCEF will further send a request to UE to update the IP-CAN session connection.

Then, in step S313, the PCEF will acknowledge the UE IP CAN update request to the PCEF.

Then, in step S314, the UE connects to the mobile network with the new QoS information, that is to say, the UE connects to the third party application service with the updated QoS policy.

Figure 4:
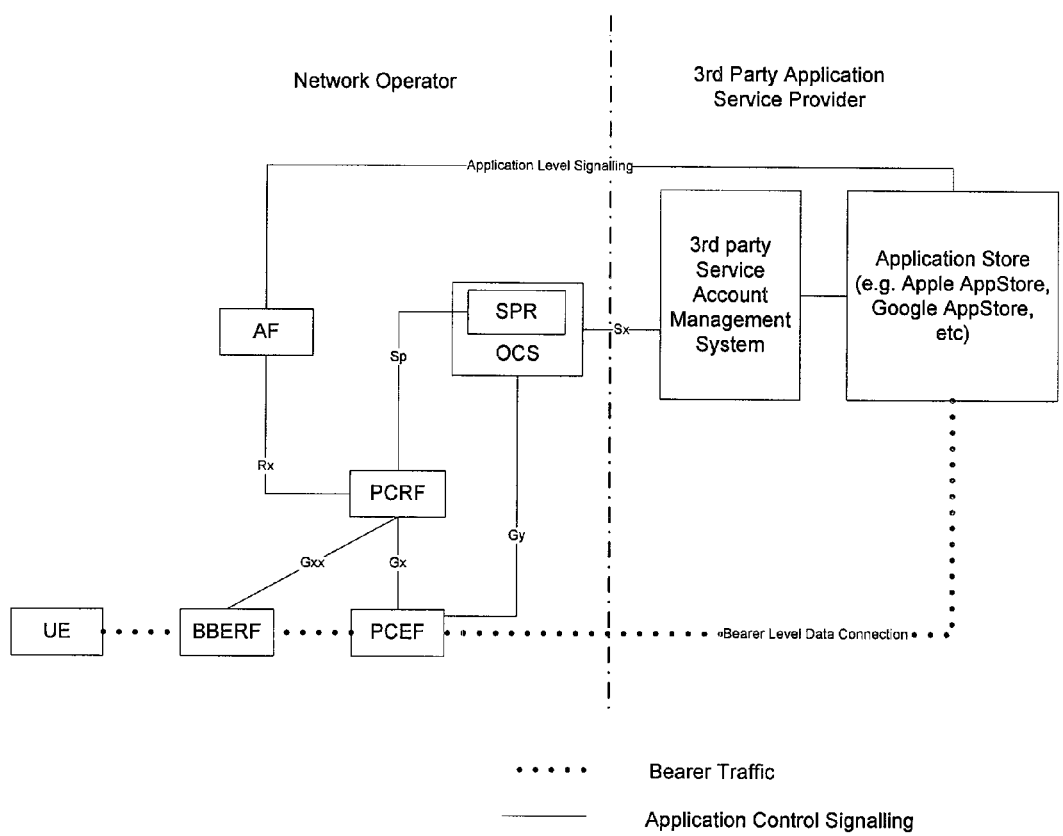
FIG. 4 illustrates another alternative architecture of an embodiment of the present invention.

FIG. 4 illustrates another alternative architecture of the embodiment of the present invention. In this scenario, the SPR is integrated into the OCS charging system.

Besides the existing OCS functionality defined by 3GPP standard, the OCS also maintains third party user's subscription information, and monitors the network usage for the third party application sponsored data service on behalf of third party applications, that is to say, the functionalities of the SPR described in the above embodiments are integrated in the OCS.

Referring to FIG. 4, an enhanced Sp reference point is proposed directly between the PCRF and the OCS (instead of between the SPR and the OCS shown in FIG. 1). For the third party application sponsored service, the PCRF will further query the OCS to verify the validation of end user's guest status and sponsorship; the PCRF will also query the end user's data usage and allowance to apply the dynamic QoS Control policy rule.

As for the OCS, the OCS will have a new Sx interface to query the end user's subscription from the third party application provider. The third party application provider maintains service subscription and user account balance. The OCS will reserve the charge from the external third party application provider. When the OCS receives granted credit, the OCS will maintain, in a cache or a temporary account, third party end user's service subscription and balance information. When the OCS detects that its end user's usage for a specific application is over a certain spending limit threshold, it will notify the PCRF to update QoS policy rule, so the third party end user's QoS will be enforced in the PCEF via the PCRF update operation.

The call flows in the above scenario are similar to that shown in FIGS. 2 and 3, but there is no Sy interface between the SPR and the OCS. Since the SPR is integrated in the OCS, there is no explicit interface interaction between the SPR and the OCS. The PCRF will direct interact with the OCS with Sp interface.

To be specific, the flow chart of third party application sponsored data connectivity session establishment procedure of the embodiment that the OCS and the SPR are integrated is similar to that shown in FIG. 2, the differences only lie in that, compared with the latter, for the former, the steps S205 and S209 are omitted, and steps S204 and S210 are implemented by SPR or OCS in stead of SPR, the receiver of the profile request in step S203 is OCS instead of SPR, and the sender of the profile response of the step S211 is OCS instead of SPR. While in this embodiment, the PCRF may have its own local configuration, such as device type, mobile MDN/MSIDSN, etc, for determining whether the user subscribe to a 3rd application service.

Besides, the flow chart of third party application sponsored data connectivity extension procedure of the embodiment that the OCS and the SPR are integrated is similar to that shown in FIG. 3, the differences only lie in that, compared with the latter, for the former, the steps S305 and S306 are omitted, the receiver of the acknowledgement in step S308 is OCS instead of SPR, and the sender of the updated usage/spending and allowance limit is OCS instead of SPR.

The embodiments of the present invention have been described above. It is understandable by those skilled in the art that the present invention is not limited to specific system, device or protocol, and various modifications or amendments can be made without departing from the scope and spirit of the scope of the attached claims.

Those skilled in the art can understand that the above-described embodiments are for purpose of illustration only, and not construed as limitation of the invention. The present invention is not limited to these embodiments. All technical solutions which do not depart from the spirit of the invention are intended to be included within the scope of the appended claims. Besides, in the claims, any reference signs placed between parentheses shall not be construed as limiting the claim. The word "comprising" does not exclude the presence of elements or steps not listed in the claim or in the to description. The word "a" or "an" preceding an element does not exclude the presence of a plurality of such elements. In device that includes a plurality of means, one or more functions of the plurality of means can be implemented by one hardware or software module; the words "first", "second" and "third" only represent name, and do not mean specific order.

What is claimed is:

1. A method of aiding controlling quality of service and/or policy and charging control of a user subscribing to a third party application service, in an online charging system in a telecommunication network, the method comprising:
sending a user subscription request to a third party application provider that provides the third party application service, the request being used to request user subscription information from the third party application provider;
obtaining a user subscription response according to a feedback from the third party application provider, the user subscription response comprising the information in responsive of the user subscription request; and
providing the user subscription response to a first module comprising a subscription profile repository configured to determine that the UE is allowed as a subscriber to the third party application provider when:
a number of the user equipment of the user falls within a specific number range allocated for the third party application provider;
the user equipment is not roaming; and
the user equipment has not exceeded a certain spending threshold.

2. The method according to claim 1, wherein the obtaining further comprises: obtaining the feedback from the third party; determining whether the user is allowed to use the third party application service according to the feedback; and taking the determination result as the user subscription response.

3. The method according to claim 1, wherein the method further comprises the sending: obtaining a user profile request sent by the first module; and generating the user subscription request according to the user profile request.

4. The method according to claim 1, wherein the method further comprises: receiving data service report from a policy and charging enforcement function, the data service report indicating the current data service usage of the third party application service used by the user; determining whether the data service usage reaches a first predetermined threshold; if the data service usage reaches the first predetermined threshold, determining whether the third party application provider can grant additional data allowance; if the third party application provider can grant additional data allowance, sending a data request to the third party application provider, the data request being used for request to grant additional data allowance for the user for the third party application service; receiving the additional data allowance from the third party application provider; and sending an acknowledgement to the policy and charging enforcement function, the acknowledgement indicating that the user can use the additional data allowance.

5. The method according to claim 4, wherein the method further comprises: if the third party application provider cannot grant additional data allowance, generating and sending a trigger to the first module, the trigger comprising information for triggering the first module to update subscription profile information.

6. A method in a first module of interacting with an online charging system in a telecommunication network, comprising:
determining whether a user subscribes to a third party application service;
if the user subscribes to the third party application service, sending a user profile request to the online charging system, the user profile request being used to request the online charging system to provide the user profile information of the user; and
obtaining a user subscription response from the online charging system, the user subscription response comprising the information in responsive of the user subscription request;
determining that the UE is allowed as a subscriber to the third party application provider when:
a number of the user equipment of the user falls within a specific number range allocated for the third party application provider;
the user equipment is not roaming; and
the user equipment has not exceeded a certain spending threshold.

7. The method according to claim 6, wherein the first module comprises subscription profile repository or policy and charging rule function; when the first module comprises subscription profile repository, the method further comprises: sending the user subscription response to the policy and charging rule function; or when the first module comprises policy and charging rule function, the method further comprises: determining service scheme according to the user subscription response.

8. The method according to claim 7, wherein the method further comprises: receiving a trigger from the online charging system, the trigger comprising information for triggering the first module to update subscription profile information; and updating subscription profile information according to the trigger.

9. The method according to claim 8, wherein the first module comprises the policy and charging rule function, and the method further comprises: determining updated service scheme according to the trigger.

10. The method according to claim 6, further comprising determining whether the user subscribes to the third party application service according to any one or several of the following items:—device type of the user; —mobile MDN or MSIDSN prefix or number range of the user equipment of the user; —IMSI prefix of the user equipment of the user; —access point number of the user equipment of the user; —access technology type of the user equipment of the user; —service flow identifier of a service requested by the user; —service type of the service requested by the user; —application type of the service requested by the user; —location of the user equipment of the user; and/or—roaming status of the user equipment of the user.

11. An online charging system (OCS) for aiding controlling quality of service and/or policy and charging control of a user subscribing to a third party application service in a telecommunication network, comprising:
the online charging system being configured to:
send a user subscription request to a third party application provider that provides the third party application service, the request being used to request user subscription information from the third party application provider;
obtain a user subscription response according to a feedback from the third party application provider, the user subscription response comprising the information in responsive of the user subscription request; and
provide the user subscription response to a first module;

wherein the first module comprises a subscription profile repository configured to determine that the UE is allowed as a subscriber to the third party application provider when:
- a number of the user equipment of the user falls within a specific number range allocated for the third party application provider;
- the user equipment is not roaming; and
- the user equipment has not exceeded a certain spending threshold.

12. A second device in a first module of interacting with an online charging system in a telecommunication network, comprising:

a subscriber profile repository configured to:
- determine whether a user subscribes to a third party application services;
- send a user profile request to the online charging system, the user profile request being used to request the online charging system to provide the user profile information of the user if the user subscribes to the third party application service; and
- obtain a user subscription response from the online charging system, the user subscription response comprising the information in responsive of the user subscription request; and determine that the UE is allowed as a subscriber to the third party application provider when:
- a number of the user equipment of the user falls within a specific number range allocated for the third party application provider;
- the user equipment is not roaming; and
- the user equipment has not exceeded a certain spending threshold.

* * * * *